(12) United States Patent
Zaencker

(10) Patent No.: US 8,665,732 B2
(45) Date of Patent: Mar. 4, 2014

(54) VOIP DIAGNOSIS

(75) Inventor: Olaf Carl Zaencker, Bad Oldesloe (DE)

(73) Assignee: VoIPFuture, GmbH, Hamburg (DE)

( * ) Notice: Subject to any disclaimer, the term of this patent is extended or adjusted under 35 U.S.C. 154(b) by 1229 days.

(21) Appl. No.: 11/828,332

(22) Filed: Jul. 25, 2007

(65) Prior Publication Data

US 2009/0028061 A1    Jan. 29, 2009

(51) Int. Cl.
*G01R 31/08* (2006.01)

(52) U.S. Cl.
USPC .......................................................... 370/244

(58) Field of Classification Search
USPC ................................................. 370/231–252
See application file for complete search history.

(56) References Cited

U.S. PATENT DOCUMENTS

| | | | |
|---|---|---|---|
| 6,580,694 B1* | 6/2003 | Baker | 370/252 |
| 6,678,250 B1* | 1/2004 | Grabelsky et al. | 370/241 |
| 7,120,122 B1* | 10/2006 | Starr et al. | 370/250 |
| 2002/0145979 A1* | 10/2002 | Baj | 370/242 |
| 2003/0128692 A1* | 7/2003 | Mitsumori et al. | 370/352 |
| 2007/0104105 A1* | 5/2007 | MeLampy et al. | 370/235 |
| 2008/0031425 A1* | 2/2008 | Glynn et al. | 379/32.04 |
| 2008/0267083 A1* | 10/2008 | MacCormick et al. | 370/252 |

FOREIGN PATENT DOCUMENTS

DE    WO2007020182    2/2007

OTHER PUBLICATIONS

Jeffrey Feigin et al., Measurement of Characteristics pf Voice over IP in a Wireless LAN Environment, Nov. 1999.*
Jeffrey Feigin et al., Measurement of Characteristics of Voice over IP in a Wireless LAN Environment, Nov. 1999.*
Jeffrey Feigin and Kaveh Pahlaven, "Measurement of characteristics of Voice over IP in a wireless LAN environment," Mobile Multimedia Communications, 1999 IEEE Int'l Workshop, ISBN 0-7803-5904-6 (Nov. 1999).

* cited by examiner

*Primary Examiner* — Mark Rinehart
*Assistant Examiner* — Mang Yeung
(74) *Attorney, Agent, or Firm* — Hugh P. Gortler

(57)    ABSTRACT

A VoIP-aware device generates data structures that include diagnostics data. The diagnostics data of each data structure identifies at least one of sender and network problems that degrade VoIP voice quality.

26 Claims, 5 Drawing Sheets

VOIP DIAGNOSIS

BACKGROUND

VoIP is an acronym for Voice over IP, or in more common terms, phone service over IP networks (e.g., the Internet). VoIP offers certain advantages over plain old telephone service (POTS), such as lower cost and increased functionality.

However, VoIP still doesn't provide the same level of service and reliability as POTS. Quality of VoIP can be degraded by sender problems, network problems, receiver problems or any combination of these problems.

Quality analysis is generally based on the analysis of audio payloads. The payloads are used to calculate compact values that represent the user perception of speech quality. This method works on the application level.

An alternative method works on the packet level. During a call between two VoIP devices (e.g., two IP phones), the device that receives an audio stream generates a report every five seconds and sends each report to the device that sent the audio stream. The reports provide feedback to the sending device. For example, RTCP reports provide information about jitter.

However, the jitter information is not accurate, as it is only a snapshot at the time of a report and is not intended to be taken quantitatively. Moreover, the RTCP reports do not explain why the jitter or other problems occurred, nor do they distinguish between network-caused problems and sender-caused problems.

DETAILED DESCRIPTION

Figure 1:
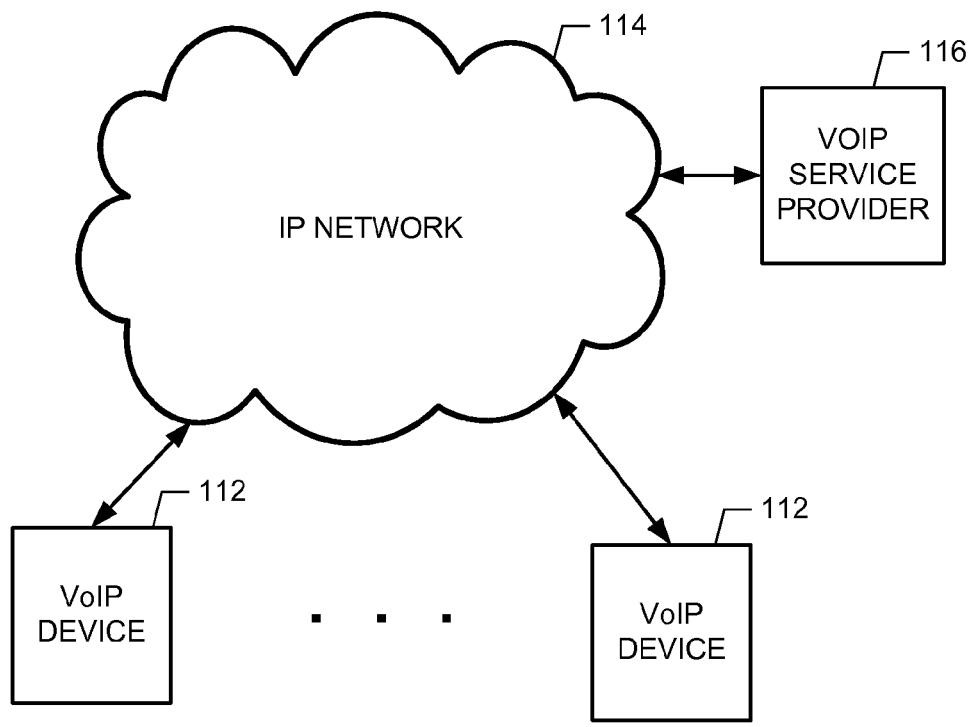
FIG. 1 is an illustration of a system in accordance with an embodiment of the present invention.

Reference is made to FIG. 1, which illustrates a VoIP system 110 including a plurality of different VoIP-aware devices 112 that communicate over an IP network 114. The network 114 can be wired, or wireless, or a combination of the two. The devices 112 are VoIP-aware because they can handle VoIP traffic (e.g., RTP packets). Most, if not all of the VoIP-aware devices 112 can handle bi-directional traffic. Such devices 112 include, without limitation, IP phones, soft clients, dual mode phones, set top boxes, gateways, media gateways, session border controllers (e.g., firewalls), CPE, conference units, and other wireline and wireless devices that generate or terminate VoIP traffic.

Each VoIP-aware device can generate its own diagnostics data. Each device generates certain diagnostics data from real traffic (e.g., VoIP, audio). Such data can be generated in real time using the receipt time and the sequence number of the VoIP packet. These devices do not require artificial traffic or sender time stamps to generate such diagnostics data.

The VoIP system 110 further includes a provider 116 of VoIP services, such as fault management (e.g., diagnostics and troubleshooting voice quality problems), and monitoring. However, these services are not burdened by low-level diagnostics, since the lower level diagnostics can be distributed among endpoints and other VoIP-aware devices. Instead, the provider 116 can perform these services at a higher level and provide more complex diagnostics. Another advantage is that, for end-to-end encryption, the VoIP traffic is invisible to VoIP-aware devices other than the sender and the receiver of a particular VoIP call.

Figure 2:
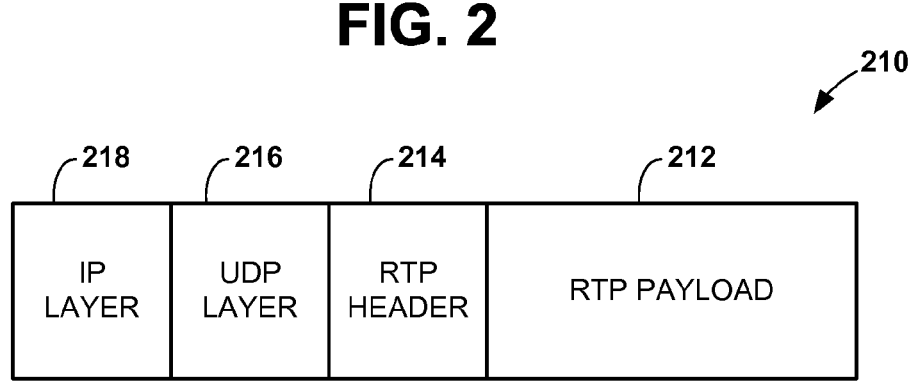
FIG. 2 is an illustration of a portion of an RTP packet.

The amount of raw data that is processed by a VoIP-aware device is enormous. Consider VoIP traffic that includes RTP packets. A portion of an RTP packet is illustrated in FIG. 2. Each packet 210 includes a payload 212, which contains real-time media (several hundreds of bytes in case of uncompressed voice); an RTP header 214, which contains twelve bytes of information related to the payload 212 (e.g. source, size, encoding type, sequence number, senders time stamp, etc); a UDP header 216; and an IP layer 218. Each packet 210 includes additional information, such as a MAC layer for wired networks and an 802.11 layer for wireless networks. Both the MAC layer and the 802.11 layer are in front of the IP layer 218. Under ideal conditions, RTP packets are sent and received isochronously (e.g., every 20 milliseconds).

However, the raw data in a VoIP packet (e.g. an RTP packet) can be reduced for diagnostics purposes to a more meaningful form, which uses data that is relevant to diagnosis only. One method for reducing the data is illustrated in FIG. 3.

Figure 3:
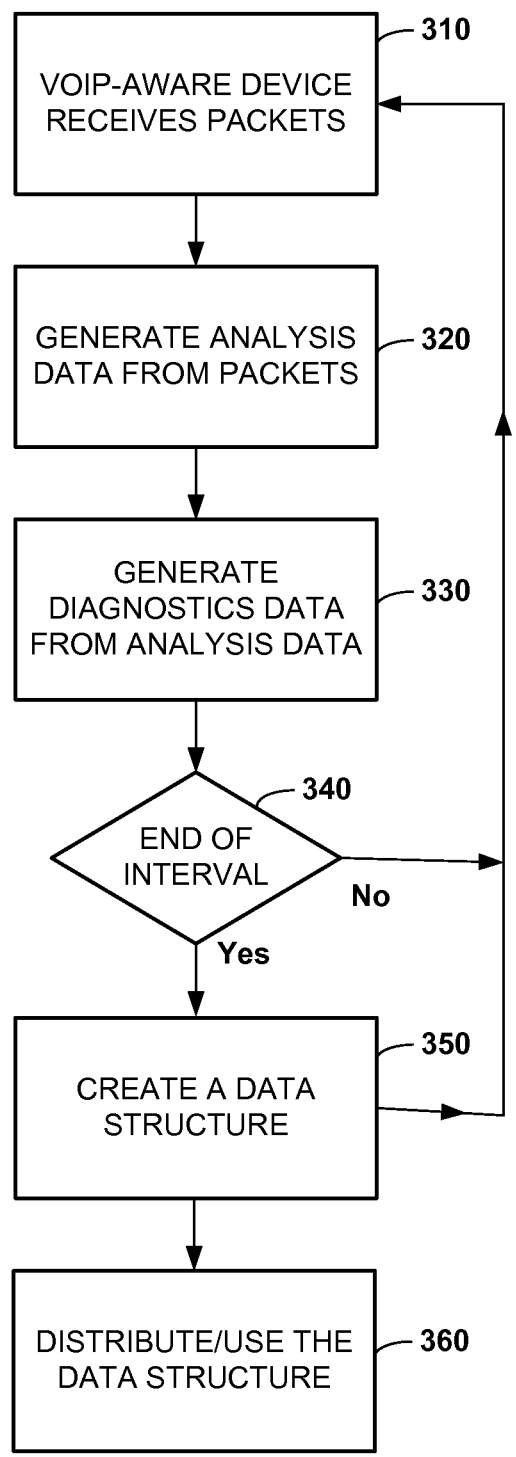
FIG. 3 is an illustration of a method in accordance with an embodiment of the present invention.

Reference is now made to FIG. 3. At block 310, packets are received by a VoIP-aware device. Receipt time may be, for example, the time at which the packet reaches the physical interface, or the time at which the protocol information (VoIP/RTP) contained in the packet is exposed to the RTP stack (a software entity that is capable of processing this specific protocol) at the receiving device.

At block 320, VoIP analysis data is generated from the packets as the packets are received. The processing at block 320 strips off unnecessary information, such as the RTP payload, IP and UDP headers, and most of the RTP header. With the remaining data, parameters that vary over time may be generated, and histograms of these parameters may also be generated. One exemplary parameter is the "Interarrival" time (IAT). As used herein, an Interarrival time is computed as the difference in receipt time of two consecutive packets from the same stream and same direction. To determine whether packets are consecutive, their sequence numbers are checked. The sequences numbers, which indicate the order in which the packets are generated, are taken from the RTP header. Consecutive sequence numbers indicate that the packets are consecutive.

The analysis data summarizes the raw data in a concise format, and allows the raw data to be discarded. The analysis data is still expressed in parameters (e.g. Interarrival time, packet loss, etc.) and simply shows whether parameters differ from ideal values or values that indicate slight degradation. However, the parameters do not identify concrete causes of problems with VoIP voice quality.

At block 330, diagnostics data is generated from the analysis data. The diagnostics data identifies problems that cause degradation in VoIP voice quality. The diagnostics data might identify sender problems. Sender problems can be clustered or divided according to implementation issues, configuration issues and utilization issues. Sender implementation problems include non-synchronized internal timers, framing problems, etc. Sender configuration problems include incorrect sample rate (e.g. 90 milliseconds), incorrect DSL settings (e.g., prioritization), etc. Sender utilization problems include a weak operating system, etc.

The diagnostics data might identify network problems. Network problems can be clustered according to configuration problems and utilization problems. Network utilization problems include jitter, congestion, buffering, packet loss, packet order, etc. Network configuration problems include buffer size of network components (e.g. router, switches), etc.

The diagnostics data can distinguish between the sender and network problems. This advantage flows from computing diagnostics data only from Interarrival times, since the Interarrival times are not based on sender time stamps. A sender time stamp represents an ideal send time. After the sender time stamp is generated for a packet, however, the packet is not necessarily sent immediately. Actual send time might be later. For example, the sender's operating system may already have influence on the packet's behavior. Moreover, the sender time stamp itself does not have any inherent accuracy. Thus, the sender's time stamp is not a reliable indicator of send time. The receipt time, on the other hand, has already been influenced by all of the potential impacts (sender, network) that usually disturb a VoIP call.

The analysis data and the diagnostics data are generated continuously. After an interval has elapsed (e.g., 5 seconds), a data structure is generated (blocks 340-350). The data structure includes the diagnostics data. The data structure may optionally include the analysis data that was used to create the diagnostics data. The data structure may also include data that identifies the VoIP-aware device that has sent the VoIP traffic and the one that has generated that data structure.

After the data structure has been generated (block 350), a new set of analysis data is generated. As a result, each data structure represents an interval of packets.

At block 360, the data structure is transmitted over the network. The data structure may be sent to at least one other VoIP-aware device (e.g., the sending device). The data structure may also be sent to a system such as a management system. A data structure may be sent periodically, or whenever a bad voice quality is diagnosed.

Sending relevant diagnostic information (problems that are related to the sender or network configuration or utilization problems) back to the VoIP sending device allows a problem to be corrected on the fly. The data structure can cause the sending device to adapt its behavior.

As a first example of adaptive behavior, a VoIP sending device sends VoIP data to a VoIP receiving device. The receiving device generates a data structure that diagnoses a problem with VoIP voice quality of the VoIP data. The data structure is sent to the sending device. If the data structure indicates that the sending device was the cause of bad voice quality (e.g., the sample rate is too high), the sending device can change its configuration. (e.g., by lowering the sample rate).

As a second example, a VoIP sending device sends VoIP data to a VoIP receiving device. The receiving device generates a data structure that diagnoses a network utilization problem (e.g., network congestion). The receiving device sends the data structure to the sending device. The sending device recognizes the network utilization problem, and then responds to the problem by lowering the usage of bandwidth. For example, the sending device can send fewer, but larger packets (thus reducing the overhead caused by the protocol headers) or change its compression rate (e.g., switching from a non-compressing codec such as G.711 to a compressing codec such as G.729), or both.

Further to the second example, the receiving device can also realize from the data structure that it too experiences the same bandwidth problem (assuming that both directions of a VoIP call use at least a common portion of the network infrastructure). Thus, when it becomes a sending device, it can adapt its behavior to reduce bandwidth.

A data structure can be sent periodically as feedback to the sending device. For devices that comply with RFC 3550, a data structure can be added to RTCP Reports using the predefined APP Format, providing useful information while still having full compatibility to other VoIP environments.

A data structure can also be sent to a service provider or other entity for further processing (e.g., management, monitoring, and storage). The service provider or other entity might receive data structures from different sources, which allows it to perform complex diagnostics. One example of complex diagnostics is correlating different problems in different audio streams at the same time (or range of time). Such correlation can be used to locate specific components that are causing degradation of VoIP voice quality. Such correlation is described in U.S. Ser. No. 11/828,335 filed Jul. 25, 2007, which is incorporated herein by reference.

Additional data structures are generated and transmitted (block 340-350). For example, if the VoIP system follows a protocol such as RTCP, a data structure may be generated every five seconds, whereby each data structure covers all VoIP traffic of that interval (e.g. all RTP packets received within those five seconds). The data structures may be generated at an interval other than five seconds. These additional structures may be transmitted periodically or whenever bad voice quality is diagnosed. This applies to RTP as well as to alternative protocols that are deployed to transport real time voice traffic.

An advantage of the method above, and of the data structures in general, is that it makes analysis and storage more manageable. The amount of raw data is huge, but the data structures reduce the data significantly. Yet the relevant data analysis and diagnostics data are still accessible, without the need to replicate all packets and their (sensible voice-) content. Furthermore, having diagnostic information for short periods (e.g. every five seconds) instead of once at the end of a call allows a higher granularity and resolution of diagnosis.

Another advantage of the method above is that problems can be diagnosed without the payload. The payloads are not included in the analysis data or the diagnostics data.

Figure 4:
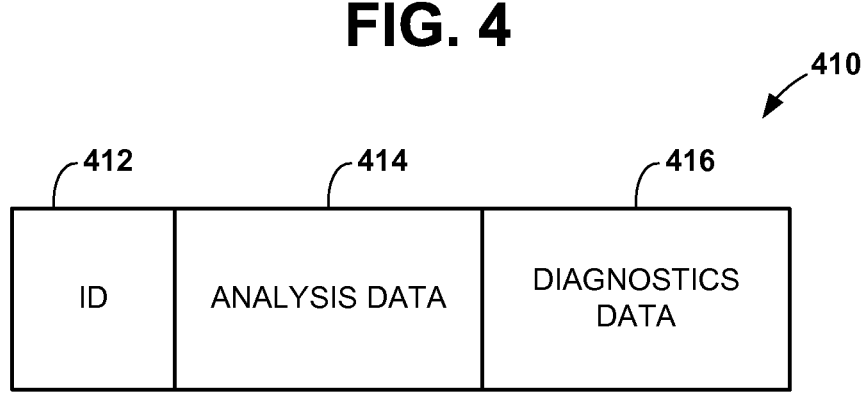
FIG. 4 is an illustration of a data structure in accordance with an embodiment of the present invention.

Reference is now made to FIG. 4. A data structure 410 may have the following format: a first field 412 containing identification data, a second field 414 containing analysis data, and a third field 416 containing diagnostics data. The function of the identification field is to identify the receiving device that generated the data structure and the sending device that has provided the VoIP data to the receiving device. There might be carrier grade gateways that perform hundreds of parallel calls, so that hundreds of data structures will be generated in parallel. In some embodiments, a data structure might include only identification data and diagnostics data. In some embodiments, the data may be arranged without fields.

Figure 5:
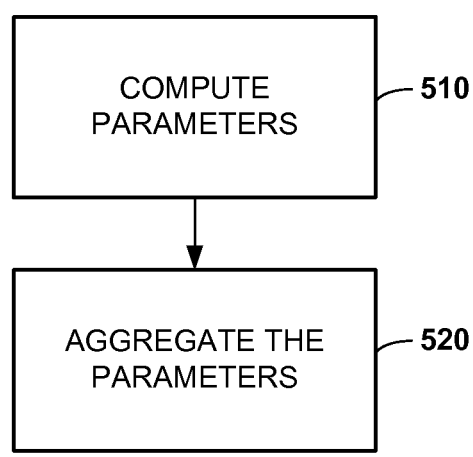
FIG. 5 is an illustration of a method of generating analysis data in accordance with an embodiment of the present invention.

Reference is now made to FIG. 5, which illustrates an exemplary method of generating the analysis data. At block 510, time-varying parameters are computed. The parameters may indicate duplicate packets, packet loss, packet order, and delay.

The parameters also include Interarrival times, which are computed as the difference between receipt times of consecutive packets. Sequence numbers of the packets can be examined to determine whether packets are consecutive. In some embodiments, Interarrival times are not computed for packets that are out-of-order, packets that precede or follow dropped packets, packets that do not contain audio information (e.g. Comfort Noise according to RFC 3389 or DTMF according to RFC 2833), etc. Once processed, the packets can be discarded.

At block 520, the parameters are aggregated. For example, the Interarrival times may be aggregated as a histogram. Such a histogram indicates the frequency of occurrence of the Interarrival times. The Interarrival times can have the same granularity as the receipt timestamps (e.g. microseconds) or a reduced granularity (e.g. milliseconds). Reducing the granularity causes the histograms to be smaller. For instance, rounding the granularity of the Interarrival times from one microsecond to 1 millisecond results in a reduction factor of 1000.

Parameters may be computed continuously, as soon as the next valid packet is received. Furthermore the histogram is filled continuously with these data. Parameters may be aggregated at intervals (e.g., every five seconds) during a call. After each interval, a histogram is completed, and a new histogram is started. Multiple histograms could be generated during a single call.

In the alternative, the parameters may be aggregated over a single cumulative interval (e.g., the entire duration of a call). The advantage of the single interval is a maximum reduction of data, but the tradeoff is a loss of granularity of information.

Other types of histograms may be generated. A histogram could be generated for packet loss. Such a histogram may use the same intervals (bins) as the histogram for Interarrival times. Packet loss histograms may be used as CPL (consecutive packet loss) histograms and CGP (consecutive good packets) histograms. These histograms may be used to decide whether packet loss is critical.

Figure 6A:
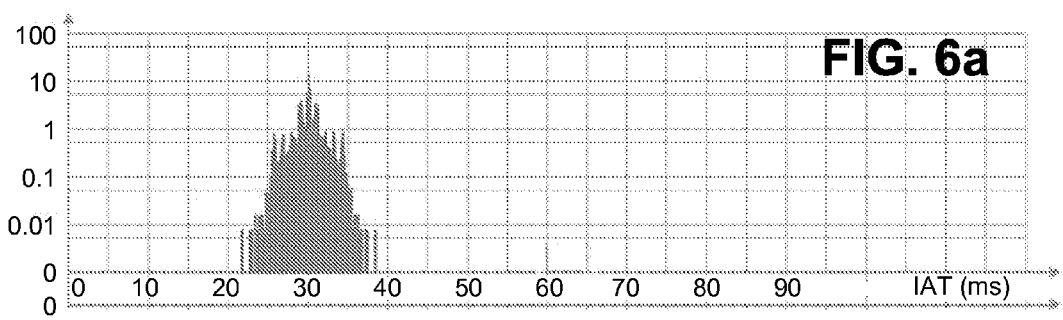
FIGS. 6a-6d are illustrations of exemplary histograms of Interarrival times.
Figure 6B:
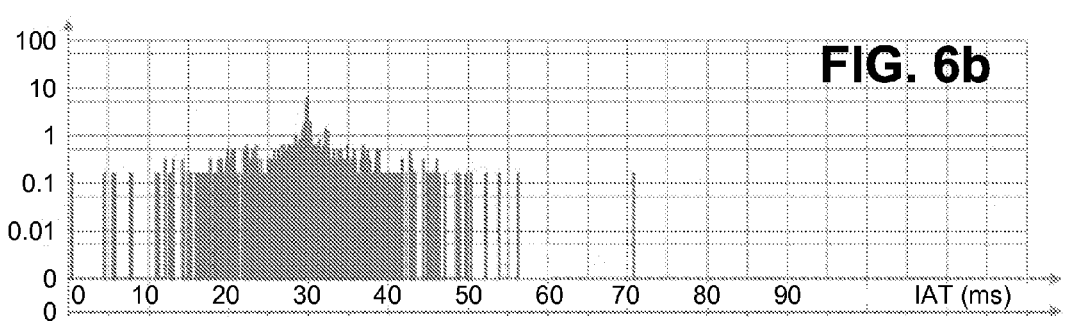
Figure 6C:
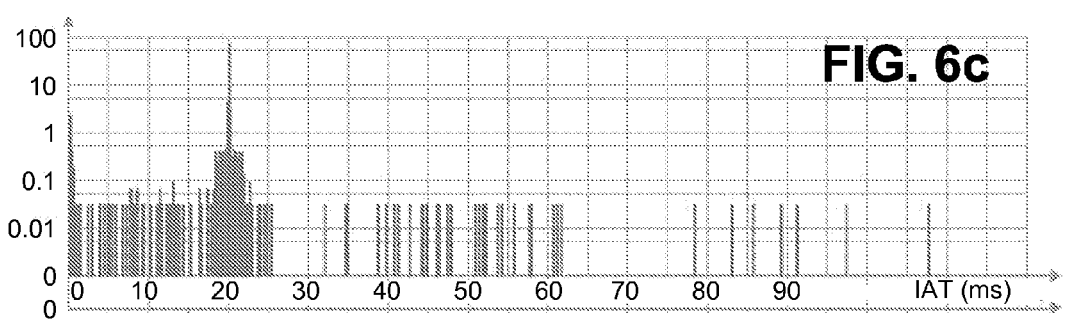
Figure 6D:
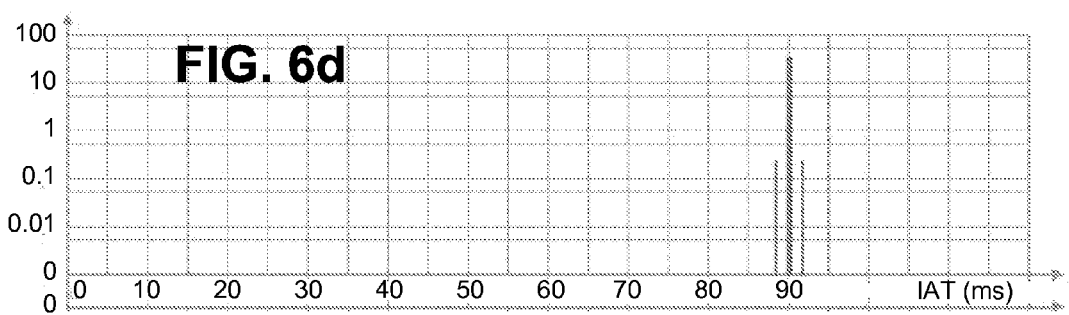

Reference is made to FIGS. 6a-6d, which illustrates some exemplary histograms of Interarrival times. FIG. 6a illustrates a call that has acceptable voice quality. FIG. 6b illustrates a network utilization problem (jitter). FIG. 6c illustrates another network utilization problem (congestion). FIG. 6e illustrates a sender configuration problem (sample rate).

Figure 7:
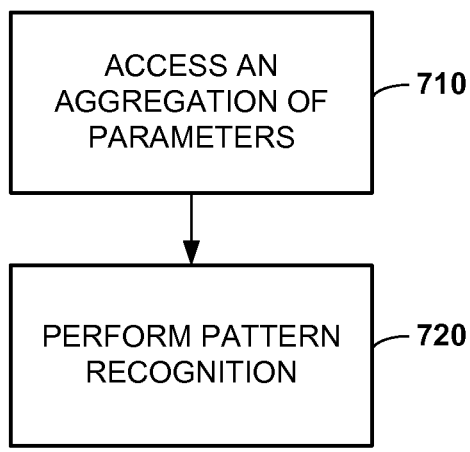
FIG. 7 is an illustration of a method of generating diagnostics data in accordance with an embodiment of the present invention.

Reference is now made to FIG. 7, which illustrates an exemplary method of generating diagnostics data. At block 710, an aggregation of parameters (e.g., a histogram of Interarrival times) is accessed.

At block 720 pattern recognition is performed on the aggregation. The rationale for the pattern recognition is as follows. Voice quality is affected by sender problems and network problems. Each problem, in turn, may include implementation, configuration and utilization problems (although implementation of IP Networks is considered not applicable, since they have no RTP capabilities). Moreover, each effect may be represented by a unique pattern of parameters which allows automatic recognition even if different patterns are superimposed. A more detailed discussion of pattern recognition can be found in WO2007020182 published Feb. 22, 2007.

A method according to an embodiment of the present invention is not limited to any particular implementation. The method could be implemented as a standalone program in a computer. For devices such as IP phones, however, the implementation may be implemented as an embedded process, such as an embedded library. The library is a small piece of software that can be integrated with a larger application, or that can be activated by an application. The library has an interface that receives data packets and returns data structures containing diagnostics data.

Figure 8:
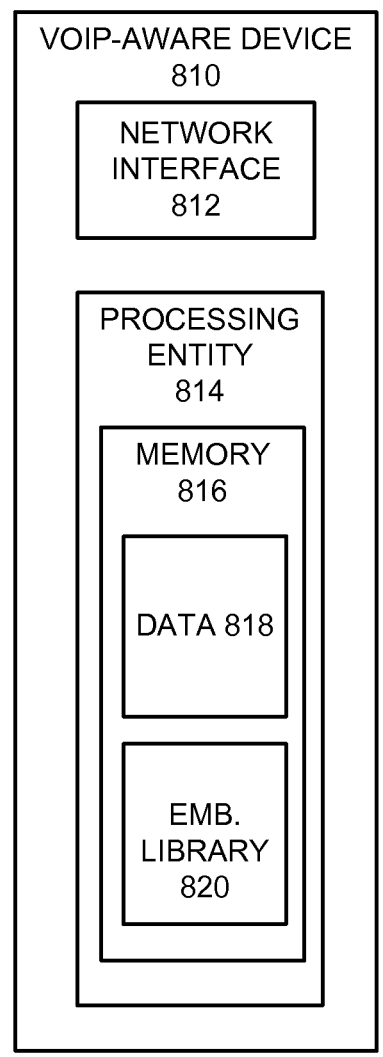
FIG. 8 is an illustration of a device in accordance with an embodiment of the present invention.

Reference is now made to FIG. 8, which illustrates an example of a VoIP-aware device 810. The device 810 includes a network interface 812, and a processing entity 814. The processing entity 814 is programmed to run a TCP/IP stack for communicating with other IP devices, and an RTP stack for communicating with other VoIP-aware devices. The processing entity 814 may include a digital signal processor and firmware. The processing entity 814 may include memory 816 encoded with data 818 for programming the device 810. The memory 816 may also be encoded with an embedded library 820 or other data for generating the diagnostics data and the data structures.

The invention claimed :

1. A method comprising:
   using a single VoIP-aware device to generate VoIP diagnostics data from receipt times of consecutive received real VoIP packets without using corresponding transmit times, the diagnostics data identifying sender problems that cause degradation in VoIP voice quality; and create and transmit a diagnostics data structure including the diagnostics data; wherein generating the VoIP diagnostics data includes:
   computing receive Interarrival times of the VoIP traffic in real time, each of the receive Interarrival times is computed as a difference between receipt times of two consecutive VoIP packets of one direction of a VoIP call;
   aggregating the receive Interarrival times, including generating histograms of frequency of occurrence of the receive Interarrival times during a VoIP call; and
   performing pattern recognition on the aggregated receive Interarrival times to identify the sender problems.

2. The method of claim 1, wherein the diagnostics data structure further includes data identifying the VoIP-aware devices that have sent and received the VoIP traffic.

3. The method of claim 1, wherein granularity of the Interarrival times is reduced to reduce histogram size.

4. The method of claim 1, wherein generating the VoIP diagnostics data further includes performing the pattern recognition on the histograms to identify sender implementation problems, sender configuration problems, network configuration problems, and network utilization problems.

5. The method of claim 1, wherein generating the VoIP diagnostics data further includes comparing at least some of the analysis data to a threshold.

6. The method of claim 1, wherein the sender problems include sender implementation problems and sender configuration problems.

7. The method of claim 1, wherein the diagnostics data also identifies network problems.

8. The method of claim 7, wherein the diagnostics data identifies and distinguishes between sender and network problems.

9. The method of claim 1, wherein the aggregated and diagnostics data are generated continuously, and wherein the method further comprises generating additional data structures periodically, each data structure including a layer of the aggregated data and a higher layer of diagnostics data.

10. The method of claim 9, wherein each data structure contains aggregated and diagnostics data over an interval of received traffic.

11. The method of claim 9, wherein the data structures are transmitted to at least one of a VoIP-aware device and a management system.

12. The method of claim 11, further comprising using the data structures for adaptive behavior.

13. The method of claim 11, further comprising using the data structures for VoIP network diagnosis.

14. A VoIP-aware device comprising:
a processor for generating VoIP diagnostics data from receipt times of consecutive received real VoIP packets without using corresponding transmit times, and generating data structures that include the diagnostics data, the diagnostics data identifying sender problems that degrade VoIP voice quality;
wherein generating the VoIP diagnostic data includes generating histograms of frequency of occurrence of receive Interarrival times during a VoIP call; and performing a pattern recognition on the histograms to identify the sender problems.

15. The device of claim 14, wherein the sender problems include sender implementation problems and sender configuration problems.

16. The device of claim 14, wherein the diagnostics data is generated in real time from Interarrival times of VoIP traffic, each Interarrival time computed as the difference between receipt times of consecutive VoIP packets.

17. The device of claim 16, wherein each data structure contains diagnostics data over an interval of received packets.

18. The device of claim 14, wherein the data structures also include the histograms.

19. The device of claim 18, wherein the data structures also include other histograms of time-varying parameters of the VoIP traffic.

20. The device of claim 14, wherein the diagnostics data is generated continuously.

21. The device of claim 14, wherein the processing entity transmits the data structures to at least one of a VoIP-aware device and a management system.

22. The device of claim 21, wherein the data structures are transmitted only when the diagnostics data therein indicates bad voice quality.

23. The device of claim 14, wherein the processing entity uses the data structures for adaptive behavior.

24. The device of claim 14, wherein the processing entity uses the data structures for VoIP network diagnosis.

25. A VoIP-aware device comprising:
means for generating VoIP diagnostics data from real VoIP traffic during a VoIP call; and
means for creating data structures during the VoIP call, the data structures including the diagnostics data; wherein the diagnostics data is generated in real time by aggregating receive Interarrival times to create histograms of frequency of occurrence of the receive Interarrival times during the VoIP call and performing pattern recognition on the histograms to identify any sender implementation or configuration problems during the VoIP call, where each of the receive Interarrival times is computed as a difference between receipt times of consecutive VoIP packets received by the VoIP-aware device.

26. The device of claim 25, wherein each data structure contains analysis and diagnostics data over an interval of received packets.

* * * * *